Jan. 3, 1939. H. F. WOLSTENHOLME 2,142,706
ROTARY INTERNAL COMBUSTION ENGINE
Filed May 4, 1937   5 Sheets-Sheet 3
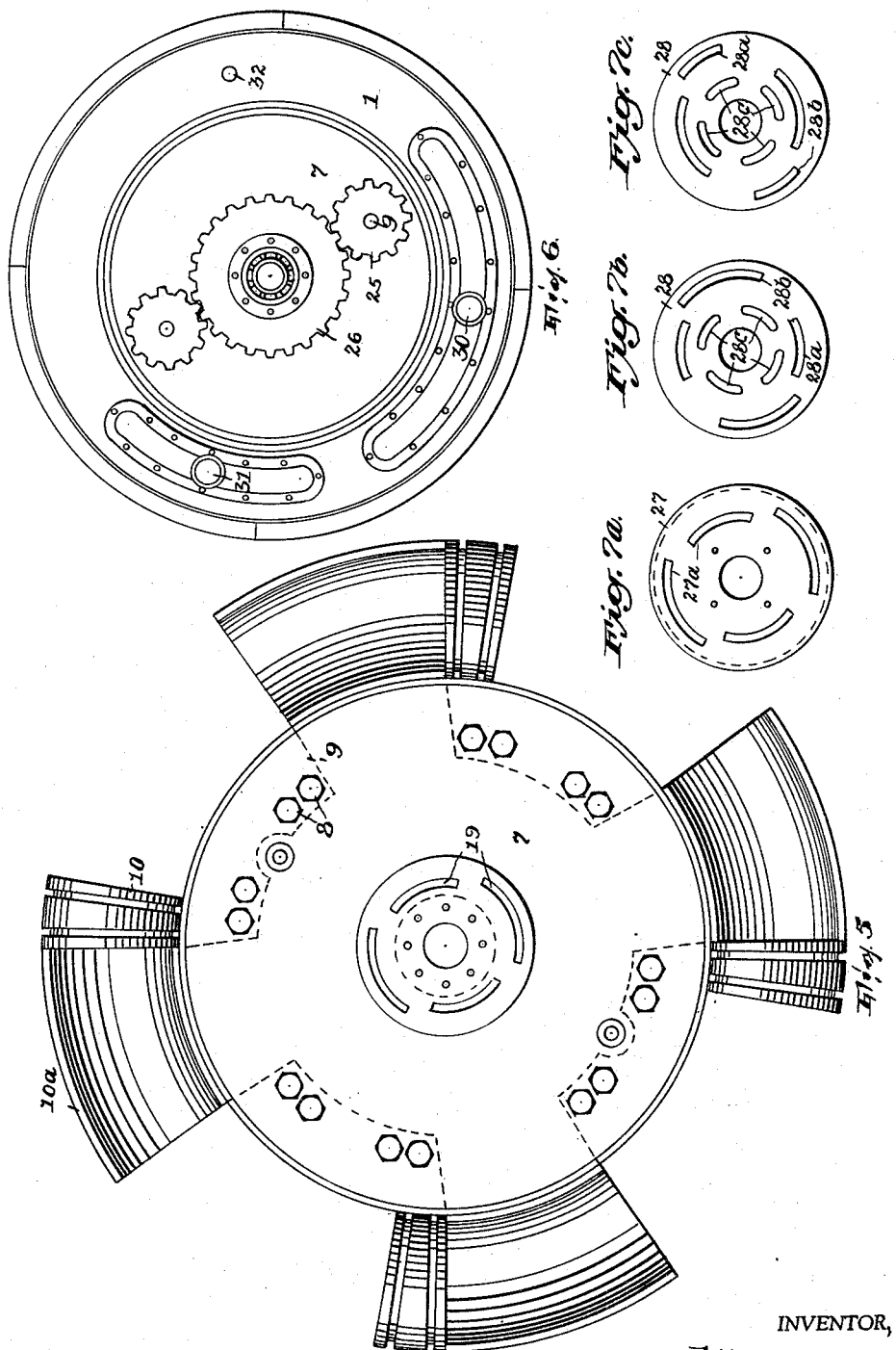
INVENTOR,
Harry F. Wolstenholme,
BY
ATTORNEY.

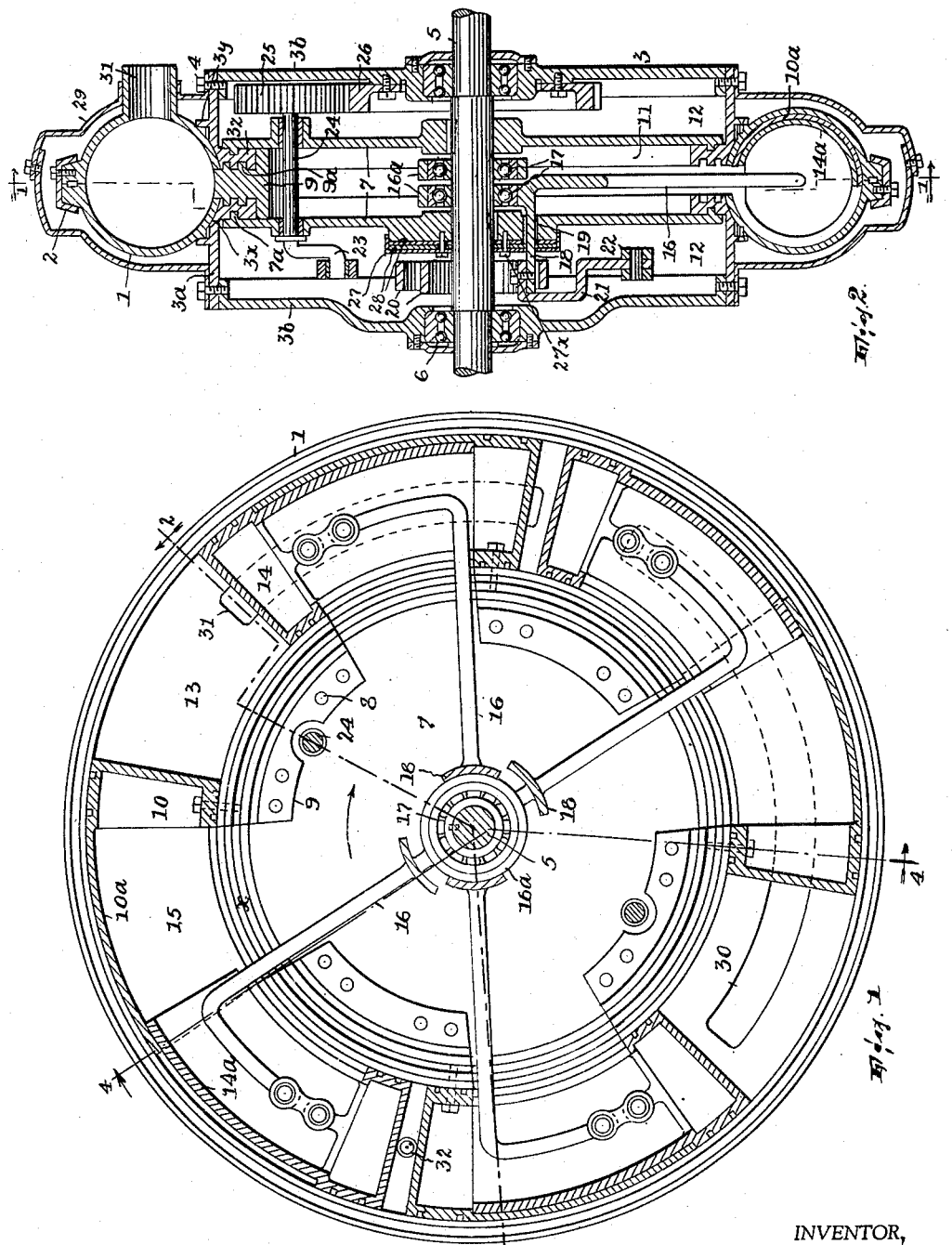

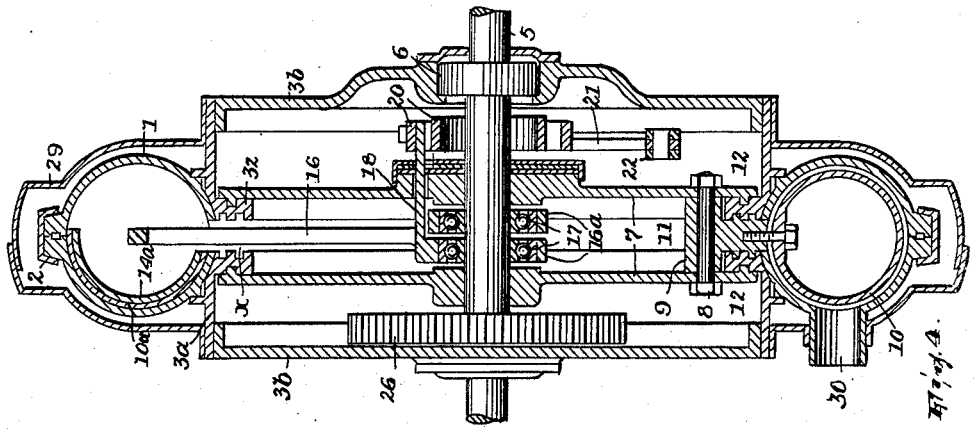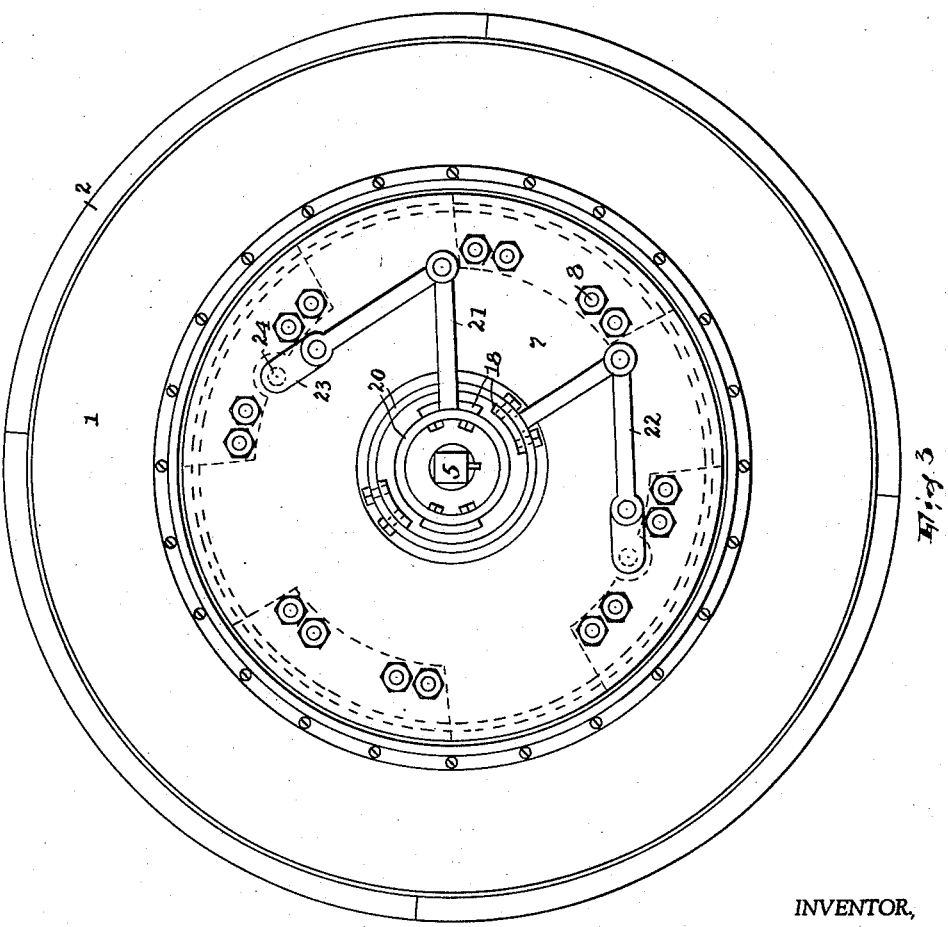

Jan. 3, 1939.  H. F. WOLSTENHOLME  2,142,706
ROTARY INTERNAL COMBUSTION ENGINE
Filed May 4, 1937  5 Sheets-Sheet 4
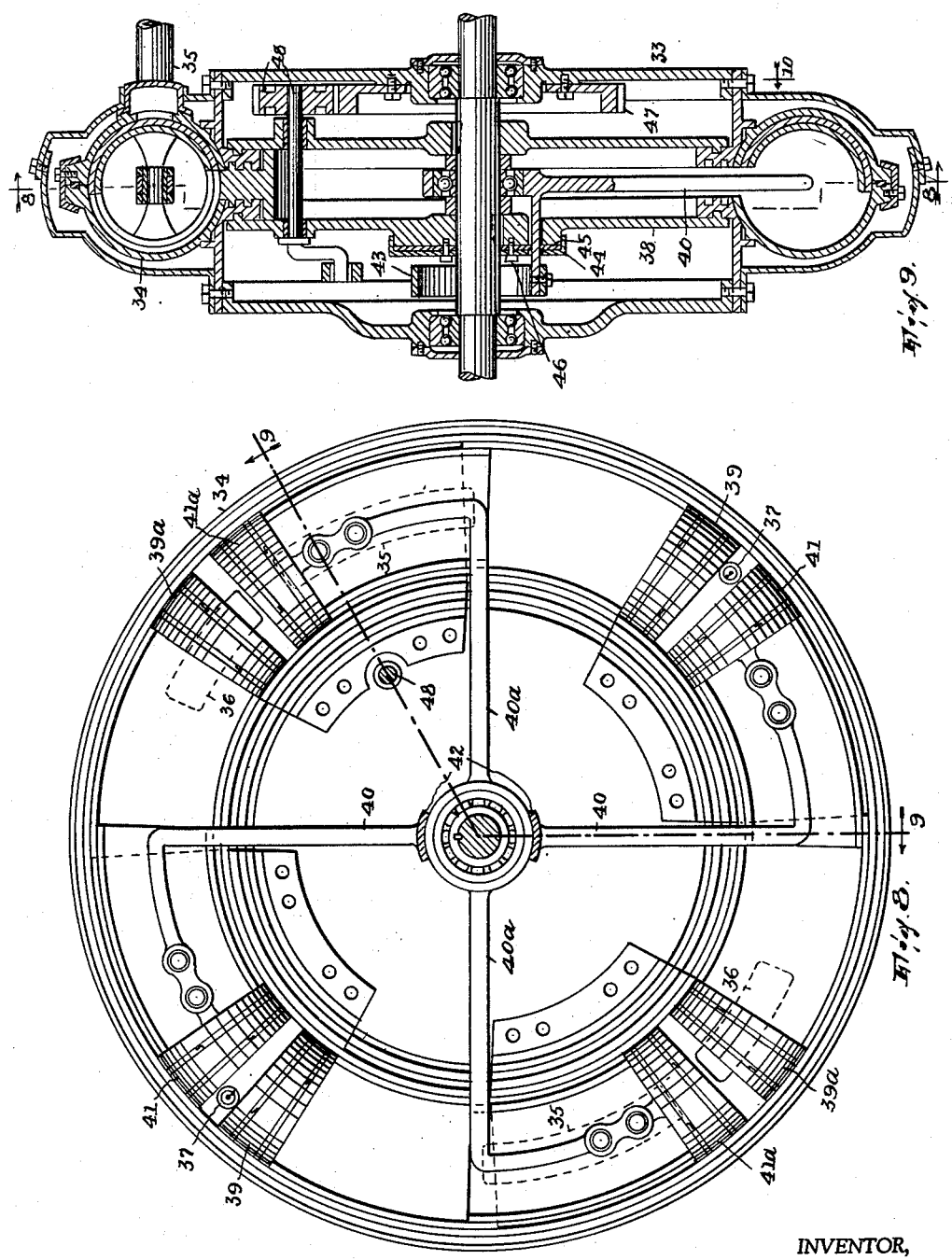
INVENTOR,
Harry F. Wolstenholme,
BY
John U. Stewart,
ATTORNEY.

Jan. 3, 1939.　　　H. F. WOLSTENHOLME　　　2,142,706
ROTARY INTERNAL COMBUSTION ENGINE
Filed May 4, 1937　　　5 Sheets-Sheet 5
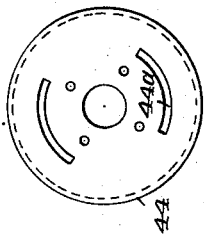
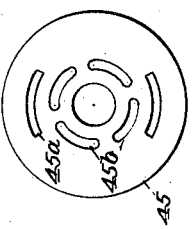
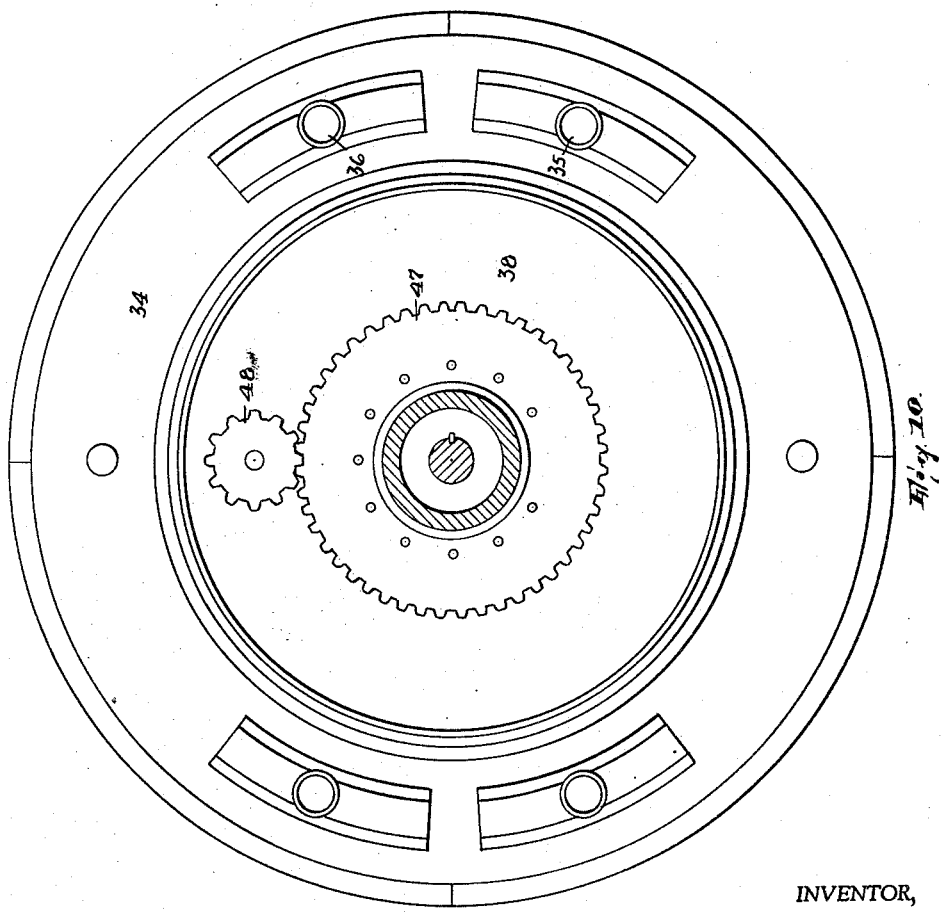
INVENTOR,
Harry F. Wolstenholme,
BY John W. Stewart,
ATTORNEY.

Patented Jan. 3, 1939

2,142,706

UNITED STATES PATENT OFFICE 2,142,706

ROTARY INTERNAL COMBUSTION ENGINE

Harry F. Wolstenholme, Paterson, N. J.

Application May 4, 1937, Serial No. 140,606

7 Claims. (Cl. 123—11)

This invention relates to internal-combustion engines of the rotary type, and it consists in certain improvements in an engine of this class set forth in my application Serial No. 61,895.

According to the present invention the lever which has or has connected therewith a power-piston, being fulcrumed coaxially with the rotor, is contained from near its outer end quite to its fulcrum within the space of the rotor, which simplifies the construction and facilitates assembly and disassembly and makes it possible, the rotor space being otherwise clear, to provide the lever with two extremities extending from its fulcrum and equip each extremity with a power-piston and consequently have two explosions, either simultaneous or alternating, to a cycle of the engine. Again, the fixed-gear is in one of the spaces flanking the rotor-space and the means, engaged with this gear, whereby rotation of one of the elements formed by the fixed structure and rotor involves oscillation of the lever includes a link in the other of such spaces flanking the rotor and a rotary device journaled in and penetrating the rotor and meshing with the gear. A portion of the lever to which the link is connected extends laterally from the rotor-space through a wall of the rotor to the space containing said link and there is novel means to seal off from each other these two spaces.

In the drawings, Figs. 1 to 6, 7a, 7b and 7c show one form of engine embodying the invention, Fig. 1 being a section on line 1—1, Fig. 2 with all parts to the left of such line, including the left-hand half of the cylinder, removed and the water-jacket omitted;

Fig. 2 a section on line 2—2, Fig. 1;

Fig. 3 a side elevation, with the left-hand cover-plate removed and the water-jacket omitted;

Fig. 4 a section on line 4—4, Fig. 1;

Fig. 5 a left-hand side elevation of the rotor;

Fig. 6 a right-hand side elevation of the engine; and

Fig. 7a shows the middle one and Figs. 7b and 7c show the other two of three disks 27 and 28 in side elevation;

Figs. 8 to 10 and Figs. 11a and 11b show another form of the engine;

Fig. 8 being a section on line 8—8, Fig. 9, with all parts to the left of such line, including the left-hand half of the cylinder, removed and the water-jacket omitted;

Fig. 9 a section on line 9—9, Fig. 8;

Fig. 10 a section in plane 10, Fig. 9; and

Figs. 11a and 11b showing the sealing disks used in this form.

First referring to the first form:

The annular cylinder proper 1 is divided in a plane perpendicular to the main shaft 5 into two halves having exterior flanges with which a grooved ring 2, suitably secured to one such flange, engages to hold the halves together.

A housing 3 is formed by annular wall 3a and spaced cover-plates or disk-like walls 3b secured to wall 3a by screws 4.

Wall 3a is grooved at 3x to receive, and has flanges 3y between which is fitted, the cylinder proper, and it has internal spaced ribs 3z grooved at their adjacent and outer faces. Wall 3a may be regarded as in effect one with the cylinder proper, thus forming the cylinder which combines with the walls 3b to form the housing chamber, with which the cylinder space communicates continuously via a slot x, Fig. 4.

So much forms with a gear 26, to be referred to the fixed structure.

The rotor is formed as follows: Keyed to the main shaft 5, which is journaled in bearings 6 centrally of and in disks or walls 3b and affords the main axis of the engine, and in the housing chamber, are two spaced disk-like walls 7 having flanges 7a to fit the outer grooves of ribs 3z. Between and to (as at 8, Fig. 1) these walls 7 are secured four equally spaced abutments comprising blocks 9, fitting between and formed with ribs 9a to fit the grooves at the inner faces of ribs 3z, and, at the counter-clockwise ends of the blocks, what I term fixed pistons 10 arranged in the cylinder and having counter-clockwise projecting half-cylindrical skirts 10a. In short, the body of the rotor comprises the two spaced walls 7, the shaft and abutments. The rotor has a space 11 and it divides the housing chamber into two spaces 12. Space 11 of the rotor is sealed off (as will appear) from the spaces 12 though it communicates between the abutments with the cylinder space through the slot x.

Clockwise-related to each abutment and co-operating therewith to drive the rotor, with what I term a power space 13 between them and sealed off from space 11 by the corresponding block 9, is a reciprocatory power-piston 14 in the cylinder; each such power-piston has a semi-cylindrical skirt 14a lapping the skirt of the next clockwise-succeeding fixed piston and the space 15 between these two pistons is open to space 11. Each two diametrically opposite power-pistons are connected by a lever 16 free to oscillate in space 11 around its fulcrum-bearing 17 on shaft 5 and also to rotate with the rotor, permitted by slot $x$. The central ring-portion 16a of each such lever has a pair of diametrically opposite stems 18 laterally projecting through slots 19 in the left-hand rotor wall 7 and to these is affixed a ring 20 having a crank 21, parts 18—20 thus forming an arm. The arm of one such lever is of less diameter than and within that of the other. Each group of parts 16—16a—18—20—21 forms what I term a piston-lever.

Transmission means connects each piston-lever with the fixed structure, thus: Each crank 21 is connected by a link 22 with the crank 23 of a rotary device comprising a shaft 24 penetrating and journaled in the rotor walls and a planet gear or pinion 25 fixed to the shaft and meshing with a sun gear 26 fixed to the housing, the planet gear being one-half the diameter of the sun gear. The cranks 21 and links are in one and the gears in the other space 12.

Where the arms 18 penetrate the left-hand rotor wall space 11 should be sealed from left-hand space 12. Hence by screws 27x a disk 27, slotted at 27a to receive and allow oscillation of the arms is secured to the adjoining rotor wall 7; and between this disk and wall are two other disks 28 apertured at 28a to receive and snugly fit, respectively, the pairs of arms, one being slotted at 28b to permit oscillation of one pair and the other slotted at 28b to permit oscillation of the other pair of arms, and both being also slotted at 28c to permit their own oscillation with respect to screws 27x.

29 is a water-jacket.

30 is the intake, 31 the exhaust and 32 a spark-plug. The intake and exhaust are on the same side of the cylinder as the piston-skirts 10a—14a. Thus as each space 15 passes intake or exhaust it is isolated therefrom.

Of course, either of the main elements (what I term the rotor and fixed structure) may rotate relatvely to the other, but it will be assumed that, as usual, the rotor rotates.

If a charge in any power space 13 is fired the corresponding piston-lever is impelled in the direction of the arrow in Fig. 1. Since the corresponding transmisson means has a purchase (by engagement of its aforesaid rotary device, journaled in the rotor) on the gear 26 of the fixed structure the impulse of the piston-lever is transmitted to the rotor. When the engine is operating, each time a power piston reaches the intake it recedes from the mentioned fixed piston coactive therewith (or located counter-clockwise thereof) to draw in fuel; then approaches such fixed piston to compress the charge, which is then fired by the spark-plug; then recedes again in response to the explosion; and finally approaches the fixed piston again to effect exhaust. The rotor rotates in the direction of said arrow, but by reversing the positions of the intake and exhaust it of course might rotate reversely. When one power-piston of a piston-lever is thus acting the other is receding in response to explosion, then moving to cause exhaust, then moving to draw in a fresh charge, and then moving to compress such charge.

As in my aforesaid application the spaces 15 communicate through the slots $x$ with the space 11 of the rotor. If this were not so the suction and pressure developed would impede the movement of the adjoining power-pistons. Because of the slot on the approach of any two power-pistons toward their abutments and receding of the other two power-pistons from their abutments the suctions and pressures tending to develop balance each other.

The construction of Figs. 8 to 11b will be understood in view of the following: In Figs. 1 to 7 as to each extremity of either piston-lever each series of intake, compression, explosion-impulse and exhaust movements (involving two full oscillations of the piston-lever) corresponds to a full cycle, or complete revolution of the rotor; only one of the power-pistons of such piston-lever receives an explosion-impulse at a time. (In the actual construction there are four such explosion-impulses to a cycle, but only because there are two piston-levers—and of course the number of piston-levers and corresponding abutments and transmission means may vary.) In Figs. 8 to 11b each series of intake, compression, explosion-impulse and exhaust movements corresponds with a partial (here a half) cycle of the rotor; both power-pistons of the piston-lever receive explosion-impulses simultaneously. Thus:

The fixed structure 33, with cylinder 34, being the same as before except for two opposed intakes 35, exhausts 36 and spark-plugs 37, as also, generally, the rotor 38 with its abutments 39, let 40 be the extremities of a piston-lever like that already described, 41 being its power-pistons, 42 its arms and 43 the rings attached thereto and having a crank (not shown, but like crank 21). For sealing the space of the rotor from the space to the left thereof there are the disks 44 and 45. Disk 44 is slotted at 44a to permit the arms 42 to oscillate; disk 45 has apertures 45a to snugly fit the arms and slots 45b to receive the screws 47 by which disk 44 is held to the rotor. In this case, there being only one piston-lever, there is only one transmission means to connect the crank with the gear 47 of the fixed structure, such means being the same as before and only partly shown at 48. This construction would involve two simultaneous explosion-impulses applied to the piston-lever once in each half-cycle of the rotor, or twice in each full cycle. With the piston-lever having only two extremities, as assumed, the two abutments 39a not coactive with its two power-pistons could be omitted.

To obtain two simultaneous explosion-impulses twice in each half-cycle, or four times in each full cycle, the piston-lever may as shown be provided with two other extremities 40a at right angles to the first two and equipped with two power-pistons 41a adapted to coact with abutments 39a.

The space 11 forms a chamber for grease which may be supplied thereto by a grease-gun adapted to be fitted to some suitably normally closed hole (not shown) in either of the walls 7. The spaces 12 form chambers for oil adapted to be supplied thereto through suitably normally closed holes (not shown) in the walls 3. These latter walls are readily removable to have access to the spaces 12 and the movable parts therein.

Having thus fully described my invention what I claim is:

1. A rotary internal-combustion engine including, with two elements one of which includes a cylinder formed annular, and having a slot extending continuously, around the main axis of the engine and the other of which includes as relatively fixed parts thereof a piston in the cylinder and two walls concentric with and surrounded by the cylinder and forming between them a space communicating with said slot, one element being rotative relatively to the other around said axis, a piston-lever fulcrumed between the walls concentrically with the cylinder and on one of said elements and having a power-piston in the cylinder, one element having means to close the slot from piston to piston during reciprocation of the power-piston, a rotary device journaled in the walls eccentrically thereof and geared with the first-named element at one side of both walls, and a link at one side of both walls connected to an eccentric point of said device, said piston-lever having a lateral arm to which the link is connected.

2. The engine set forth in claim 1 characterized by said arm projecting from an eccentric point of the piston-lever and the wall adjoining the link having an aperture penetrated by and permitting oscillation of said arm.

3. The engine set forth in claim 1 characterized by said device being geared with the first-named element at one side and the link being at the other side of both walls.

4. A rotary internal-combustion engine including, with two elements one of which includes a cylinder formed annular, and having a slot extending continuously, around the main axis of the engine and the other of which includes as relatively fixed parts thereof a piston in the cylinder and two walls concentric with and surrounded by the cylinder and forming between them a space communicating with said slot, one element being rotative relatively to the other around said axis, a piston-lever fulcrumed between the walls concentrically with the cylinder and on one of said elements and having a power-piston in the cylinder, one element having means to close the slot from piston to piston during reciprocation of the power-piston, a rotary device journaled in the walls eccentrically thereof and geared with the first-named element at one side of both walls, a link at one side of both walls connected to an eccentric point of said device, said piston-lever having a lateral arm projecting from an eccentric point thereof and to which the link is connected and the wall adjoining the link having an aperture penetrated by and permitting oscillation of the arm, and means to close the aperture during oscillation of the arm.

5. A rotary internal-combustion engine including, with two elements one of which includes a cylinder formed annular, and having a slot extending continuously, around the main axis of the engine and the other of which includes as relatively fixed parts thereof a pair of spaced pistons in the cylinder and two walls concentric with and surrounded by the cylinder and forming between them a space communicating with said slot, one element being rotative relatively to the other around said axis, a piston-lever fulcrumed between the walls concentrically with the cylinder and on one of said elements and having power-pistons in the cylinder alternating with and respectively coactive with the first-named pistons, one element having means to close the slot from each first-named piston to the power-piston coactive therewith during each reciprocation of such power-piston, a rotary device journaled in the walls eccentrically thereof and geared with the first-named element at one side of both walls, and a link at one side of both walls connected to an eccentric point of said device, said piston-lever having a lateral arm to which the link is connected.

6. The engine set forth in claim 1 characterized by the second-named element including the means to close the cylinder slot and by such means and the first-named piston forming a structure interposed between and fixed to said walls.

7. A rotary internal-combustion engine including, with two elements one of which includes a cylinder formed annular, and having a slot extending continuously, around the main axis of the engine and the other of which includes as relatively fixed parts thereof a piston in the cylinder and two walls concentric with and surrounded by the cylinder and forming between them a space communicating with said slot, one element being rotative relatively to the other around said axis, a piston-lever fulcrumed between the walls concentrically with the cylinder and on one of said elements and having a power-piston in the cylinder, one element having means to close the slot from piston to piston during reciprocation of the power-piston, a rotary device journaled in the walls eccentrically thereof and geared with the first-named element at one side of both walls and means at one side of both walls for transmitting rotary motion to said device from the piston-lever.

HARRY F. WOLSTENHOLME.